(12) United States Patent
Sachidanand Sinha et al.

(10) Patent No.: US 12,334,998 B2
(45) Date of Patent: Jun. 17, 2025

(54) CAPABILITY FOR MULTIPLE BEAMFORMING CODEBOOKS

(71) Applicant: QUALCOMM Incorporated, San Diego, CA (US)

(72) Inventors: Abhishek Saurabh Sachidanand Sinha, San Diego, CA (US); Deepak Agarwal, San Diego, CA (US); Michael Francis Garyantes, Bradley Beach, NJ (US); Rohan Salvi, San Diego, CA (US); Orod Raeesi, Uusimaa (FI); James Krysl, San Diego, CA (US); Senthilkumar Sundaram, San Diego, CA (US); Kalyan Kuppuswamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/820,057

(22) Filed: Aug. 16, 2022

(65) Prior Publication Data

US 2024/0063851 A1 Feb. 22, 2024

(51) Int. Cl.
*H04B 7/0456* (2017.01)
*H04B 7/06* (2006.01)

(52) U.S. Cl.
CPC ......... *H04B 7/0456* (2013.01); *H04B 7/0617* (2013.01)

(58) Field of Classification Search
CPC ............................ H04B 7/0456; H04B 7/0617
USPC ........................................................ 375/267
See application file for complete search history.

(56) References Cited

U.S. PATENT DOCUMENTS

| 10,931,339 | B2 * | 2/2021 | Huang | H04B 7/0456 |
| 2015/0289147 | A1 * | 10/2015 | Lou | H04B 7/0634 |
| | | | | 370/329 |
| 2019/0052345 | A1 * | 2/2019 | Yunoki | H04B 7/0695 |
| 2019/0141744 | A1 * | 5/2019 | Naghshvar | H04B 7/0452 |
| 2020/0287602 | A1 | 9/2020 | Park et al. | |
| 2021/0111772 | A1 * | 4/2021 | Lee | H04B 7/0452 |
| 2021/0273747 | A1 * | 9/2021 | MacKenzie | H04L 1/0078 |
| 2023/0160936 | A1 * | 5/2023 | Obermaier | G01R 29/0871 |
| | | | | 343/702 |
| 2024/0039813 | A1 * | 2/2024 | Agarwal | H04L 43/08 |

FOREIGN PATENT DOCUMENTS

| WO | WO-2020242355 A1 * | 12/2020 | ............. H01Q 1/523 |
| WO | WO-2020248794 A1 * | 12/2020 | |

OTHER PUBLICATIONS

International Search Report and Written Opinion—PCT/US2023/029758—ISA/EPO—Nov. 20, 2023.

\* cited by examiner

*Primary Examiner* — Leila Malek
(74) *Attorney, Agent, or Firm* — Guang Y. Zhang; Harrity & Harrity, LLP

(57) ABSTRACT

Various aspects of the present disclosure generally relate to wireless communication. In some aspects, a radio unit may output capability information regarding a number of beamforming codebooks supported by the radio unit. The radio unit may obtain configuration information that configures one or more beamforming codebooks for an antenna array of the radio unit. The radio unit may communicate using the one or more beamforming codebooks. Numerous other aspects are described.

29 Claims, 13 Drawing Sheets

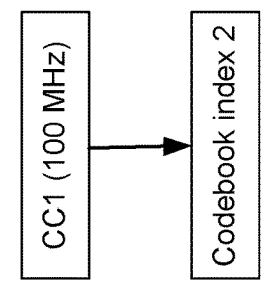

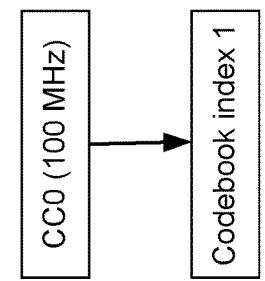

| Antenna array | Band # | Capability parameters |
|---|---|---|
| 0 | n77 (3300-4200) | capabilities[0]<br>  codebook-index? 1<br>  max-supported-frequency-dl? 3400 Mhz<br>  min-supported-frequency-dl? 3300 Mhz<br>  max-supported-bandwidth-dl? 100 Mhz<br>  max-num-carriers-dl? 1<br>  max-carrier-bandwidth-dl? 100 Mhz<br>  min-carrier-bandwidth-dl? 100 Mhz |
| 0 | n77 (3300-4200) | capabilities[1]<br>  codebook-index? 2<br>  max-supported-frequency-dl? 3500 Mhz<br>  min-supported-frequency-dl? 3400 Mhz<br>  max-supported-bandwidth-dl? 100 Mhz<br>  max-num-carriers-dl? 1<br>  max-carrier-bandwidth-dl? 100 Mhz<br>  min-carrier-bandwidth-dl? 100 Mhz |

510 — Antenna array
515 — Capability information 505
500

FIG. 5

Capability information 805

| Antenna array | Band # | Capability parameters | Antenna array | Band # | Capability parameters |
|---|---|---|---|---|---|
| 0 | n77 (3300-4200) | capabilities[0]<br>codebook-index? 1<br>max-supported-frequency-dl? 3400 Mhz<br>min-supported-frequency-dl? 3300 Mhz<br>max-supported-bandwidth-dl? 100 Mhz<br>max-num-carriers-dl? 1<br>max-carrier-bandwidth-dl? 100 Mhz<br>min-carrier-bandwidth-dl? 100 Mhz | 1 | n79 (4400-5000) | capabilities[0]<br>codebook-index? 3<br>max-supported-frequency-dl? 4600 Mhz<br>min-supported-frequency-dl? 4400 Mhz<br>max-supported-bandwidth-dl? 50 Mhz<br>max-num-carriers-dl? 4<br>max-carrier-bandwidth-dl? 50 Mhz<br>min-carrier-bandwidth-dl? 50 Mhz |
| 0 | n77 (3300-4200) | capabilities[1]<br>codebook-index? 2<br>max-supported-frequency-dl? 3500 Mhz<br>min-supported-frequency-dl? 3400 Mhz<br>max-supported-bandwidth-dl? 100 Mhz<br>max-num-carriers-dl? 1<br>max-carrier-bandwidth-dl? 100 Mhz<br>min-carrier-bandwidth-dl? 100 Mhz | 1 | n79 (4400-5000) | capabilities[1]<br>codebook-index? 4<br>max-supported-frequency-dl? 4800 Mhz<br>min-supported-frequency-dl? 4600 Mhz<br>max-supported-bandwidth-dl? 50 Mhz<br>max-num-carriers-dl? 4<br>max-carrier-bandwidth-dl? 50 Mhz<br>min-carrier-bandwidth-dl? 50 Mhz |

FIG. 8

CAPABILITY FOR MULTIPLE BEAMFORMING CODEBOOKS

FIELD OF THE DISCLOSURE

Aspects of the present disclosure generally relate to wireless communication and to techniques and apparatuses for capability signaling for multiple beamforming codebooks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a radio unit. The method may include outputting capability information regarding a number of beamforming codebooks supported by the radio unit. The method may include obtaining configuration information that configures one or more beamforming codebooks for an antenna array of the radio unit. The method may include communicating using the one or more beamforming codebooks.

Some aspects described herein relate to a method of wireless communication performed by a distributed unit. The method may include obtaining capability information regarding a number of beamforming codebooks supported by a radio unit. The method may include outputting configuration information that configures one or more beamforming codebooks for an antenna array of the radio unit.

Some aspects described herein relate to a radio unit for wireless communication. The radio unit may include a memory and one or more processors coupled to the memory. The one or more processors may be configured to output capability information regarding a number of beamforming codebooks supported by the radio unit. The one or more processors may be configured to obtain configuration information that configures one or more beamforming codebooks for an antenna array of the radio unit. The one or more processors may be configured to communicate using the one or more beamforming codebooks.

Some aspects described herein relate to a distributed unit for wireless communication. The distributed unit may include a memory and one or more processors coupled to the memory. The one or more processors may be configured to obtain capability information regarding a number of beamforming codebooks supported by a radio unit. The one or more processors may be configured to output configuration information that configures one or more beamforming codebooks for an antenna array of the radio unit.

Some aspects described herein relate to a non-transitory computer-readable medium that stores a set of instructions for wireless communication by a radio unit. The set of instructions, when executed by one or more processors of the radio unit, may cause the radio unit to output capability information regarding a number of beamforming codebooks supported by the radio unit. The set of instructions, when executed by one or more processors of the radio unit, may cause the radio unit to obtain configuration information that configures one or more beamforming codebooks for an antenna array of the radio unit. The set of instructions, when executed by one or more processors of the radio unit, may cause the radio unit to communicate using the one or more beamforming codebooks.

Some aspects described herein relate to a non-transitory computer-readable medium that stores a set of instructions for wireless communication by a distributed unit. The set of instructions, when executed by one or more processors of the distributed unit, may cause the distributed unit to obtain capability information regarding a number of beamforming codebooks supported by a radio unit. The set of instructions, when executed by one or more processors of the distributed unit, may cause the distributed unit to output configuration information that configures one or more beamforming codebooks for an antenna array of the radio unit.

Some aspects described herein relate to an apparatus for wireless communication. The apparatus may include means for outputting capability information regarding a number of beamforming codebooks supported by the radio unit. The apparatus may include means for obtaining configuration information that configures one or more beamforming codebooks for an antenna array of the radio unit. The apparatus may include means for communicating using the one or more beamforming codebooks.

Some aspects described herein relate to an apparatus for wireless communication. The apparatus may include means for obtaining capability information regarding a number of beamforming codebooks supported by a radio unit. The apparatus may include means for outputting configuration information that configures one or more beamforming codebooks for an antenna array of the radio unit.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5-8 are diagrams illustrating an example of capability information associated with one or more antenna arrays of an RU.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
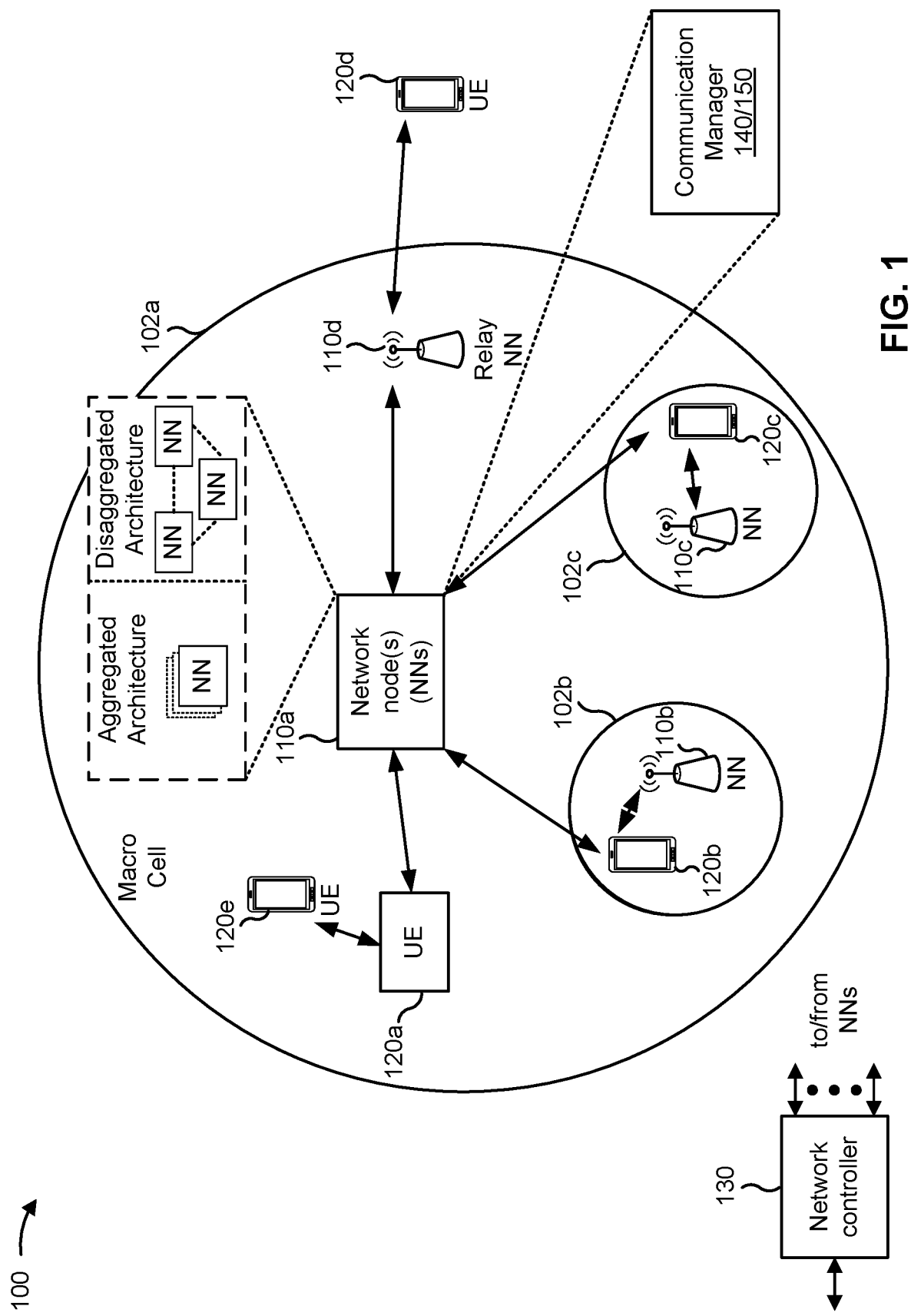
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node 110 (e.g., a radio unit) may include a communication manager 140. As described in more detail elsewhere herein, the communication manager 140 may output capability information regarding a number of beamforming codebooks supported by the radio unit; obtain configuration information that configures one or more beamforming codebooks for an antenna array of the radio unit; and communicate using the one or more beamforming codebooks. Additionally, or alternatively, the communication manager 140 may perform one or more other operations described herein.

In some aspects, a network node 110 (e.g., a distributed unit) may include a communication manager 150. As described in more detail elsewhere herein, the communication manager 150 may obtain capability information regarding a number of beamforming codebooks supported by a radio unit; and output configuration information that configures one or more beamforming codebooks for an antenna array of the radio unit. Additionally, or alternatively, the communication manager 150 may perform one or more other operations described herein.

As indicated above, FIG. 1 is provided as an example. Other examples may differ from what is described with regard to FIG. 1.

Figure 2:
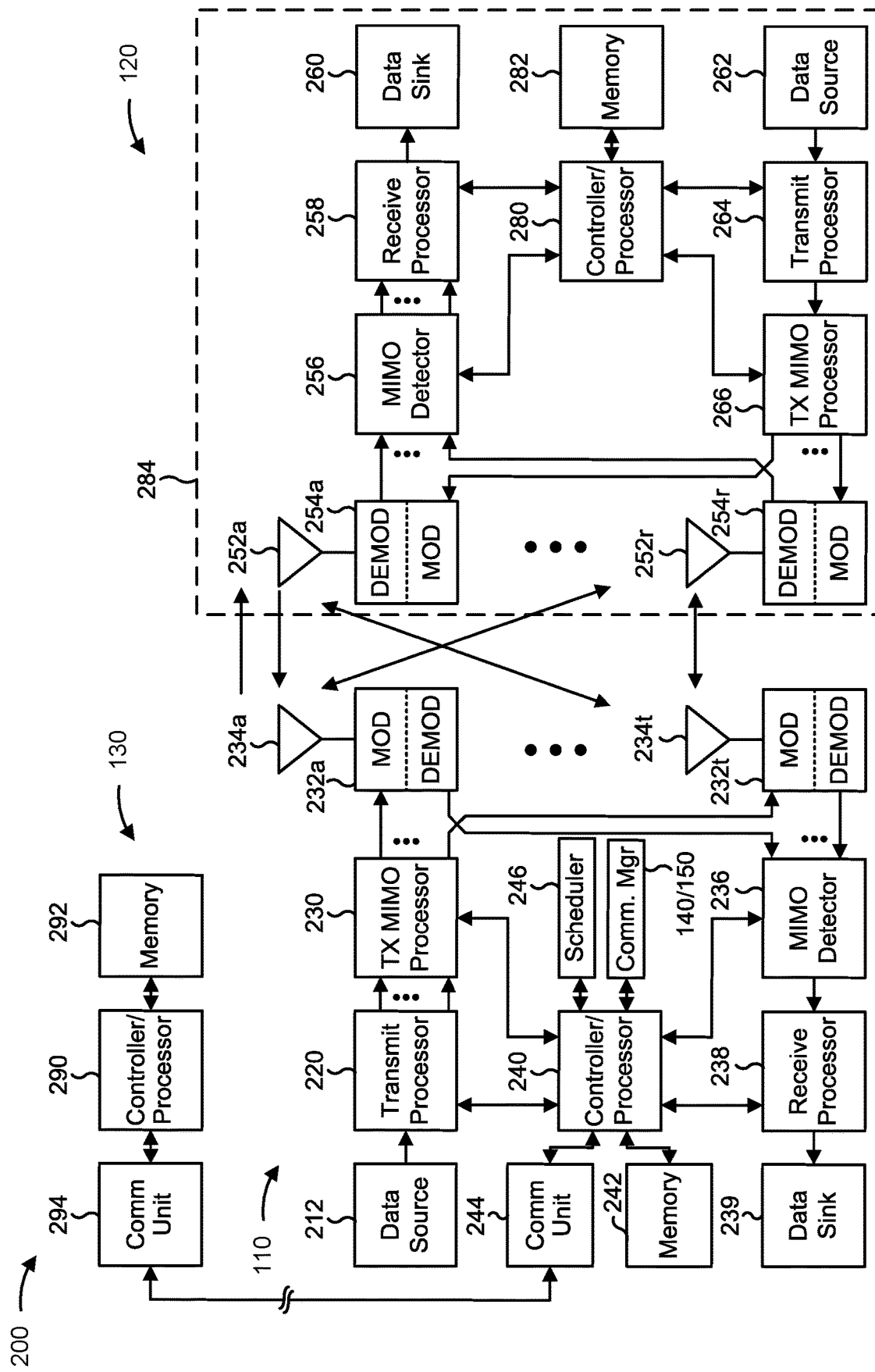
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

The controller/processor 240 of the network node 110, the controller/processor 280 of the UE 120, and/or any other component(s) of FIG. 2 may perform one or more techniques associated with beamforming, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
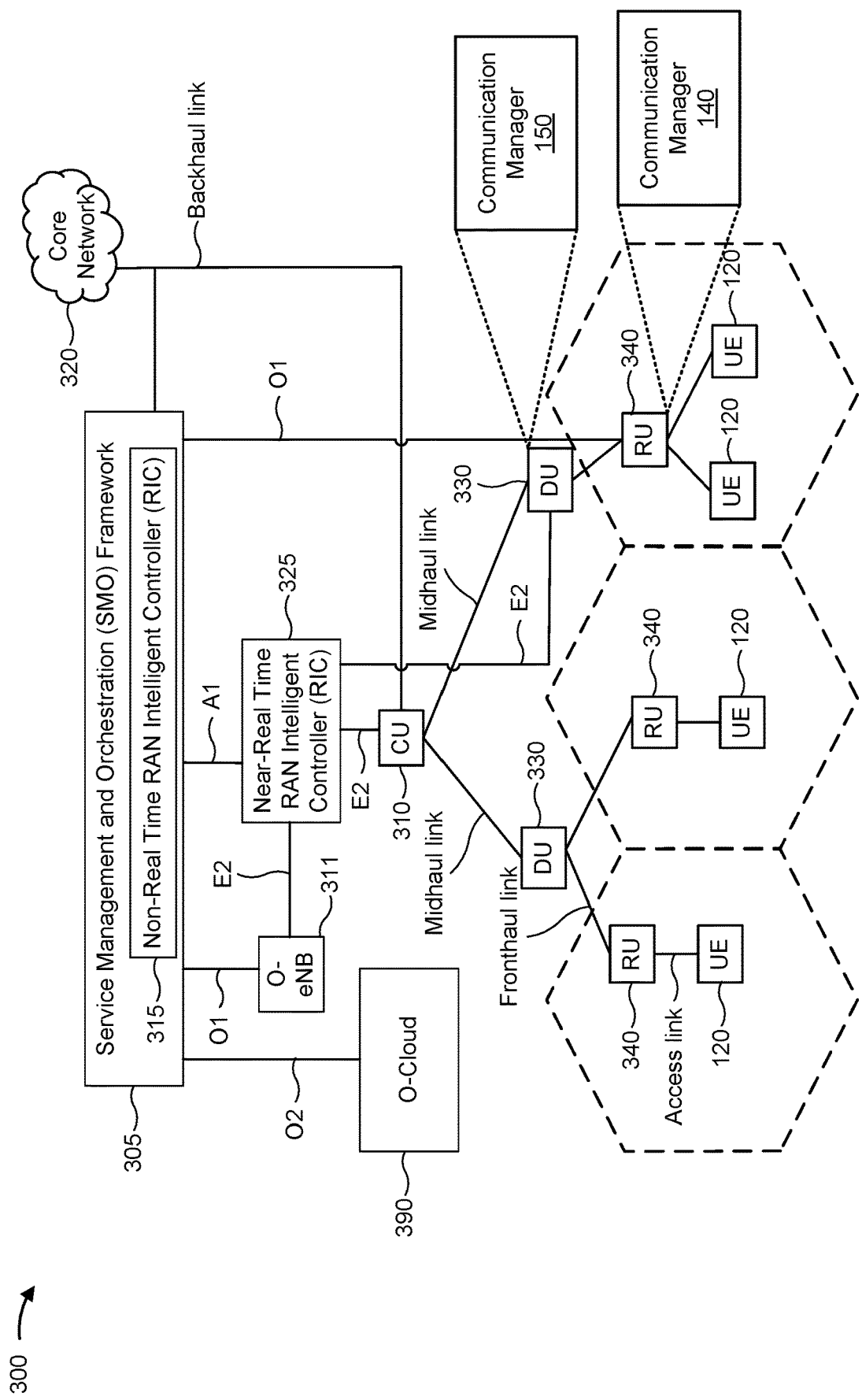
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 (e.g., an O-RAN DU (O-DU)) via respective midhaul links, such as through F1 interfaces. Each of the DUs 330 may communicate with one or more RUs 340 (e.g., an O-RAN RU (O-RU)) via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

A variety of functional splits can be implemented. As mentioned above, a functional split may define how functions are apportioned among one or more CUs 310, one or more DUs 330, and one or more RUs 340. One example of a functional split is functional split Option 7, in which a DU 330 (managing one or more RUs 340) performs low-PHY layer and RF functions, and a CU 310 performs high-PHY, MAC, RLC, PDCP, and RRC functions. One example of functional split Option 7 is Option 7-2x, in which physical layer operations are split between an O-RU (e.g., RU 340) and an O-DU (e.g., DU 330). In Option 7-2x, high-PHY functions including RE mapping, layer mapping, scrambling, precoding, modulation, and encoding are performed at the O-DU, and low-PHY functions including analog beamforming, digital-to-analog conversion, digital beamforming, iFFT, and precoding are performed at the O-RU. Some techniques described herein for capability signaling and configuration of multiple beamforming codebooks can be implemented using functional split Option 7-2x. Additionally, or alternatively, such techniques can be implemented using another functional split, such as another Option 7 functional split or a different functional split.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

In some aspects, the RU 340 includes means for outputting capability information regarding a number of beamforming codebooks supported by the radio unit; means for obtaining configuration information that configures one or more beamforming codebooks for an antenna array of the radio unit; and/or means for communicating using the one or more beamforming codebooks. In some aspects, the means for the RU to perform operations described herein may include, for example, one or more of communication manager 140, transmit processor 220, TX MIMO processor 230, modem 232, antenna 234, MIMO detector 236, receive processor 238, controller/processor 240, memory 242, or scheduler 246. In some aspects, the means for the RU to perform operations described herein may include, for example, one or more of input component 1340, processor 1320, output component 1350, memory 1330, or communication component 1360.

In some aspects, the DU 330 includes means for obtaining capability information regarding a number of beamforming codebooks supported by a radio unit; and/or means for outputting configuration information that configures one or more beamforming codebooks for an antenna array of the radio unit. In some aspects, the means for the distributed unit to perform operations described herein may include, for example, one or more of communication manager 150, transmit processor 220, TX MIMO processor 230, modem 232, antenna 234, MIMO detector 236, receive processor 238, controller/processor 240, memory 242, scheduler 246, input component 1340, processor 1320, output component 1350, memory 1330, or communication component 1360.

As indicated above, FIG. 3 is provided as an example. Other examples may differ from what is described with regard to FIG. 3.

A network node, such as an RU or a DU, may transmit and receive communications using beamforming. "Beamforming" refers to manipulating the electrical properties (such as phase, amplitude, or other electrical properties) of antenna elements of an antenna array such that a beam is generated for transmission or reception of a communication. Many different beams can be generated by an antenna array having a plurality of antenna elements. The number and properties of beams that can be generated by an antenna array may be a function of properties of the antenna array, such as a number of rows of antenna elements, a number of columns of antenna elements, a number of layers of the antenna array, a horizontal spacing of the antenna elements, and/or a vertical spacing of the antenna elements, among other parameters.

An RU (e.g., an O-RU) may be configured by a DU (e.g., an O-DU) with a beamforming codebook. A beamforming codebook is a data structure including parameters for generating a plurality of beams. For example, a beamforming codebook (sometimes referred to as a codebook) may include information indicating a plurality of beam indexes. The beamforming codebook may indicate, for a beam index, a set of beamforming parameters (such as beamforming weights). After configuring the beamforming codebook, the DU can indicate, to the RU, a beam to use for a communication according to a beam index of the beamforming codebook. Thus, the beamforming codebook may improve efficiency of beamformed communications at the DU and the RU. The DU can also update the beamforming codebook by providing an updated beamforming codebook or information indicating a modification to an existing beamforming codebook to the RU.

A beamforming codebook may be associated with a maximum size, which may be constrained by capabilities of the RU, a limit specified in a wireless communication specification, practical considerations regarding signaling, or the like. For example, a fronthaul specification for O-RAN communication may specify a maximum size, for a global beamforming codebook of an antenna panel, of 32,000 beams (e.g., 32,000 indexes), such that the beamforming codebook is addressable with a 15-bit beam identifier field. Furthermore, an antenna panel may be limited to a configuration of a single codebook (such as based on a wireless communication specification). Limiting an antenna panel to being configured with a single beamforming codebook may be beneficial from a complexity standpoint.

However, a single beamforming codebook with a maximum size (for example, 32,000 beam indexes) may have certain shortcomings. For example, an RU may implement massive multiple-input multiple-output (MIMO), in which an antenna panel communicates simultaneously using a large number of layers (such as, for example, 16 downlink layers and 8 uplink layers). It may be beneficial to use separate beams for each layer of a massive MIMO communication. Furthermore, a massive MIMO communication may involve a number of resource blocks (RBs) (e.g., physical RBs (PRBs)). For example, a massive MIMO communication may involve up to 273 PRBs and/or up to 8 carriers. In some deployments, a different beam is used for each PRB of a massive MIMO communication (which may improve gain of the massive MIMO communication), or multiple PRBs (e.g., a subset of the PRBs) are associated with a beam. Still further, a different beam may be used for each carrier of massive MIMO communication at an antenna panel. Assuming separate beams for each combination of PRB, carrier, and layer of the massive MIMO communication, the total number of potential usable beams may be up to BeamIdtotal=NUM_LAYERS×PRB_GRANULARITY× NUM_CCs=24×273×8=52416, which exceeds a maximum size of 32,000 beam indexes. As another example, an antenna panel with 64 antenna elements can also be used in a 32-element configuration, a 16-element configuration, an 8-element configuration, or a 4-element configuration, and each of these different configurations may use different beamforming weight vector sizes (thus necessitating different beamforming codebooks). Still further, for a wideband system supporting multiple carriers, it may be beneficial to distribute carrier processing at the O-RU without sharing codebook address space. Even further, for dynamic spectrum sharing (DSS), in a first slot, an O-DU can allocate PRBs for LTE using a first set of beamforming weights, and in a second slot, the O-DU can allocate PRBs for LTE using a second set of beamforming weights, further increasing complexity.

Some techniques described herein provide signaling associated with supporting multiple beamforming codebooks, such as multiple beamforming codebooks for a single antenna panel of an RU (e.g., an O-RU). For example, an RU may transmit capability information indicating a capability for being configured with multiple beamforming codebooks. In some aspects, the capability information may indicate one or more parameters associated with the multiple beamforming codebooks, such as information regarding a bandwidth, a supported frequency, a number of carriers, a bandwidth per carrier, and so on. A DU may configure one or more beamforming codebooks for the antenna panel of the RU in accordance with the capability information. Thus, the total addressable number of beam indexes is increased for a given antenna panel of an RU, which improves performance of massive MIMO communications, enables support for different numbers of antennas (e.g., a 32-element configuration, a 16-element configuration, an 8-element configuration, or a 4-element configuration), enables distributed O-RU processing, and improves the performance of DSS. The total addressable number of beam indexes is increased without increasing a size of a 15-bit field used to indicate a beam index. Furthermore, in some aspects, a given beam identifier can be used to refer to a given beam (e.g., a set of beamforming weights) across multiple beamforming codebooks, which is particularly beneficial in the context of distributed O-RU processing and DSS. For example, the DU or the RU may select a specific beamforming codebook (e.g., may identify beam parameters corresponding to a given beam index in the specific beamforming codebook) based on a carrier and an antenna panel identifier being used, which enables indication of a set of beamforming weights, across multiple codebooks, without increasing the size of the field used to indicate the beamforming index. These techniques can be applied for beamforming at a transmit antenna array as well as beamforming at a receive antenna array.

Figure 4:
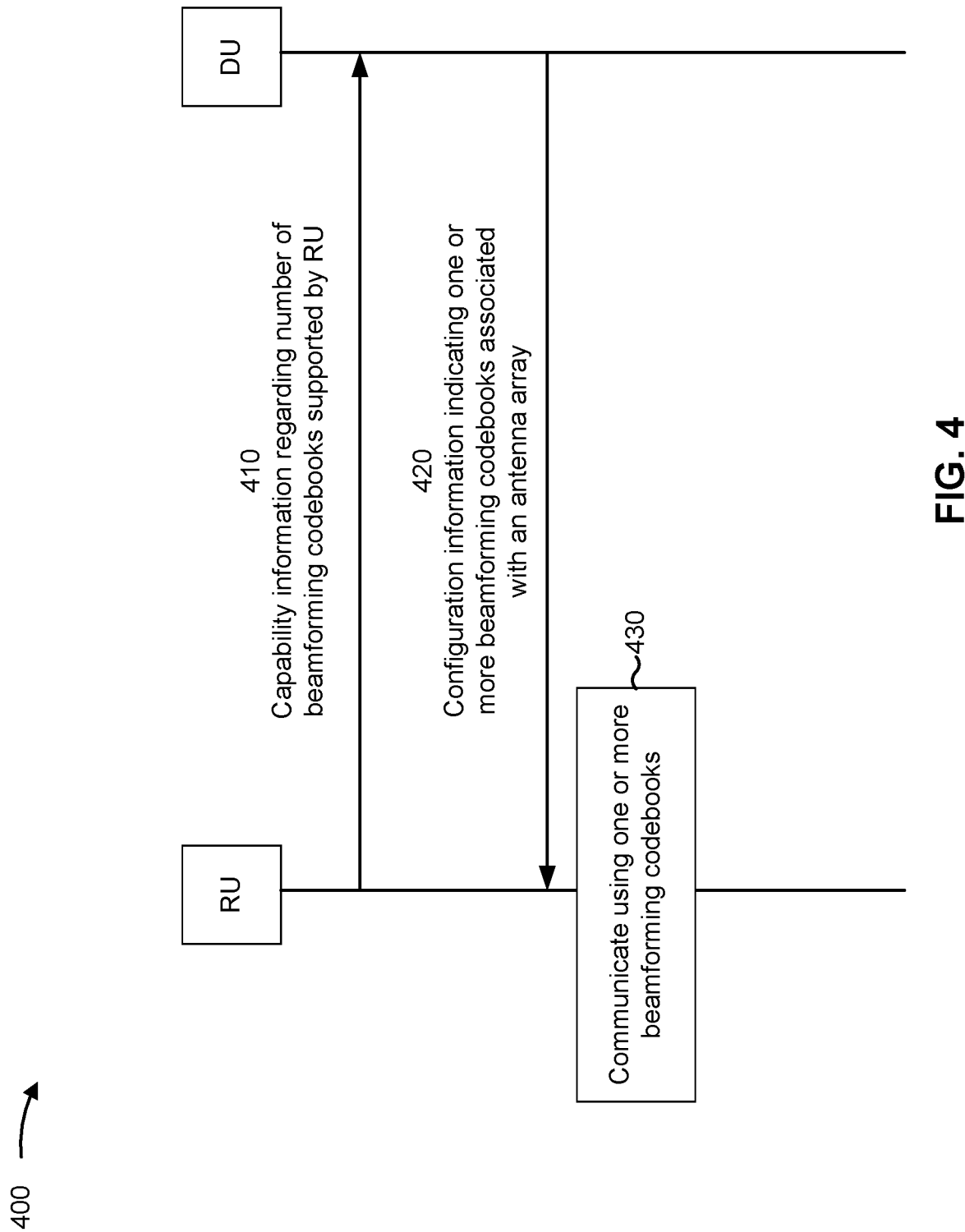
FIG. 4 is a diagram illustrating an example of signaling associated with supporting multiple beamforming codebooks for an antenna panel of a radio unit (RU), in accordance with the present disclosure.

FIG. 4 is a diagram illustrating an example 400 of signaling associated with supporting multiple beamforming codebooks for an antenna panel of an RU, in accordance with the present disclosure. As shown, example 400 includes an RU (e.g., an RU 340, a network node 110) and a DU (e.g., a DU 330, a network node 110). In some aspects, the RU and the DU may be nodes of a same disaggregated base station.

As shown by reference number 410, the RU may output capability information regarding a number of beamforming codebooks supported by the RU. For example, the RU may provide the capability information to the DU via a fronthaul connection. In some aspects, the capability information may relate to an antenna array, such as a transmit antenna array (e.g., an antenna array being used for transmission) or a receive antenna array (e.g., an antenna array being used for reception) of the RU. In some aspects, the RU may provide capability information regarding multiple antenna arrays (e.g., for each antenna array, of the multiple antenna arrays, the RU may provide respective capability information). In some aspects, the RU may provide multiple information elements (IEs) of capability information for a single antenna array. For example, the RU may provide first capability information and second capability information relating to a single antenna array, and the first capability information and the second capability information may indicate different capabilities supported by the single antenna array. The RU may provide the capability information at startup, based on a request from the DU, based at least in part on a change in configuration at the RU, or the like. In some aspects, the RU may output the capability information using management-plane (M-plane) signaling.

The capability information may include information regarding a number of beamforming codebooks supported by the RU (e.g., by an antenna array of the RU). For example, the capability information may indicate that the antenna array supports multiple beamforming codebooks (e.g., via an O-RU capability MULTIPLE-CODEBOOK-SUPPORTED). As another example, the capability information may identify (e.g., in an o-ran-module-cap.yang->ru-capabilities->max-codebooks-supported IE) a maximum number of beamforming codebooks supported by the transmit antenna array (where the maximum number may be greater than 1).

In some aspects, the capability information may indicate a codebook index. For example, the capability information may indicate a codebook index and a set of capability parameters associated with the codebook index. As another example, the capability information may indicate a band number (e.g., a band number as defined by a 3GPP technical specification or another specification), and may identify a codebook index associated with the band number, as well as a set of capability parameters associated with the band number and/or the codebook index. Thus, the capability information may indicate an association between a codebook index and the set of capability parameters (which may, for example, be capability parameters relating to communication using carriers). In some aspects, the capability information may indicate two or more codebook indexes, and may indicate a respective set of capability parameters associated with each codebook index of the two or more codebook indexes. A set of capability parameters associated with a codebook index may include, for example, a maximum supported frequency (e.g., a highest frequency for which communication using the codebook index is supported), a minimum supported frequency (e.g., a lowest frequency for which communication using the codebook index is supported), a maximum supported bandwidth for the codebook index (e.g., a maximum total bandwidth of all carriers configured for the codebook index), a maximum number of carriers (e.g., a maximum quantity of carriers that can be configured for communication using the codebook index), a maximum carrier bandwidth (e.g., a maximum bandwidth of a carrier that can be configured for communication using the codebook index), a supported technology (e.g., LTE or NR), or a minimum carrier bandwidth (e.g., a minimum bandwidth of a carrier that can be configured for communication using the codebook index). Particular examples of capability information and capability parameters are provided in FIGS. 5-8.

In some aspects, the capability information may be provided in an o-ran-module-cap.yang information element (IE). For example, the capability information may indicate O-RU capabilities (e.g., a number of downlink ports num-of-ru-ports-dl, a number of uplink ports num-of-ru-ports-ul, and/or a number of spatial streams).

As shown by reference number 420, the RU may obtain configuration information indicating one or more beamforming codebooks, associated with an antenna array of the RU, from the DU. For example, the DU may provide the one or more beamforming codebooks to the RU using M-plane signaling. The one or more codebooks may be based at least in part on the capability information. For example, if the capability information indicates that an antenna array of the RU supports up to 2 beamforming codebooks, then the DU may configure up to 2 beamforming codebooks for the antenna array. As another example, if the capability information indicates a maximum frequency, a minimum frequency, a maximum number of carriers, and a maximum carrier bandwidth for up to 2 beamforming codebooks, the DU may configure no more than 2 beamforming codebooks and the configuration may adhere to the maximum frequency, the minimum frequency, the maximum number of carriers, and the maximum carrier bandwidth. Thus, beamforming codebooks may be configured per antenna array of the RU, which improves beamforming performance, throughput, and coverage of the RU.

A beamforming codebook may indicate a beam index (sometimes referred to as a beamID) and a set of beamforming weights corresponding to the beam index. In some aspects, a beam index can refer to different sets of beamforming weights in different beamforming codebooks. For example, a first beamforming codebook associated with a first antenna array of the RU and a second beamforming codebook associated with a second antenna array of the RU may each include a same beam index, and the same beam index may indicate a first set of beamforming weights in the first beamforming codebook and a second set of beamforming weights (different than the first set of beamforming weights) in the second beamforming codebook. In some aspects, the beamforming codebook (or antenna array) to which a beam index belongs may be indicated by an identifier associated with the beam index (e.g., provided in a same message as the beam index), such as an eAxC-ID or a component carrier identifier. For example, the RU may identify the beamforming codebook based at least in part on an eAxC-ID, a component carrier identifier, or a combination thereof. Thus, a same beam index can be used across two or more beamforming codebooks on two or more different antenna arrays of the RU, which reduces signaling overhead associated with indicating the beam index and allows the usage of a 15-bit beam index field to indicate more than 32,768 beam indexes (e.g., across two or more beamforming codebooks).

As shown by reference number 430, the RU may communicate using the one or more beamforming codebooks. For example, the RU may use a set of beamforming weights, indicated by the one or more beamforming codebooks, to perform a downlink transmission. As another example, the RU may receive, from the DU, information indicating a beam index corresponding to the one or more beamforming weights for the downlink transmission. As yet another example, the RU may receive a beam index and an identifier (e.g., an eAxC-ID or a component carrier identifier) and may identify an antenna array and/or beamforming codebook to which the beam index relates using the identifier. The RU may generate a beam (e.g., may cause the antenna array to generate a beam) using a set of beamforming weights corresponding to the beam identifier in the identified beamforming codebook. The RU may transmit or receive a communication using the set of beamforming weights.

As indicated above, FIG. 4 is provided as an example. Other examples may differ from what is described with regard to FIG. 4.

FIG. 5 is a diagram illustrating an example 500 of capability information 505 associated with an antenna array of an RU (e.g., RU 340, the RU of FIG. 4). The RU may output the capability information 505 to a DU (e.g., DU 330, the DU of FIG. 4), and the DU may configure one or more beamforming codebooks for the antenna array of the RU according to the capability information 505.

As shown by reference number 510, the capability information 505 may indicate an antenna array with which the capability information 505 is associated (e.g., antenna array 0). As shown by reference number 515, the capability information 505 may indicate a band with which the capability information 505 is associated (e.g., NR band n77 having a frequency range of 3300 MHz to 4200 MHz). As shown, the capability information 505 may include two capability IEs: one identified as "capabilities[0]" and another identified as "capabilities[1]." Each capability IE may be associated with a codebook index. As shown by reference number 520, a first capability IE is associated with codebook index 1. A second capability IE is associated with codebook index 2. A capability IE associated with a given codebook index may indicate a set of capability parameters that can be used to configure a beamforming codebook for the indicated antenna array (e.g., antenna array 0) and the given band (e.g., band n77). Since there are two capability IEs associated with the indicated antenna array and band, two beamforming codebooks can be configured for the indicated antenna array and band.

As mentioned above, the capability information 505 may indicate a set of capability parameters associated with a codebook index. As shown by reference number 525, the capability information 505 indicates a maximum supported frequency (for a downlink carrier) for codebook index 0 of 3400 MHz and a minimum supported frequency (for a downlink carrier) for codebook index 0 of 3300 MHz. As shown by reference number 530, the capability information 505 indicates a maximum bandwidth (for a beamforming codebook) for codebook index 0 of 100 MHz. As shown by reference number 535, the capability information 505 indicates a maximum number of carriers for codebook index 0 of 1 carrier (e.g., 1 component carrier). As shown by reference number 540, the capability information 505 indicates a maximum carrier bandwidth and a minimum carrier bandwidth (for a downlink carrier) for codebook index 0 of 100 MHz. As shown, codebook index 2 is associated with the same maximum and minimum carrier bandwidths, the same maximum number of carriers, the same maximum bandwidth, and a supported frequency range of 3400 MHz-3500 MHz.

Reference number 545 shows a mapping of beamforming codebooks and carriers (e.g., component carriers (CCs)) in accordance with the capability information 505. As shown, a first CC (CC0) with a 100 MHz bandwidth can be mapped to a first beamforming codebook and the antenna array 0, on band n77, according to the set of capability parameters associated with codebook index 1. For example, the first CC may have a frequency range of 3300 MHz-3400 MHz. As further shown, a second CC (CC1) with a 100 MHz bandwidth can be mapped to a second beamforming codebook and the antenna array 0, on band n77, according to the set of capability parameters associated with codebook index 2. For example, the second CC may have a frequency range of 3400 MHz-3500 MHz. Thus, the capability information 505 indicates how one or more (in example 500, two) beamforming codebooks can be configured for an antenna array, and how each configured beamforming codebook can be associated with one or more carriers.

As indicated above, FIG. 5 is provided as an example. Other examples may differ from what is described with regard to FIG. 5.

Figure 6:
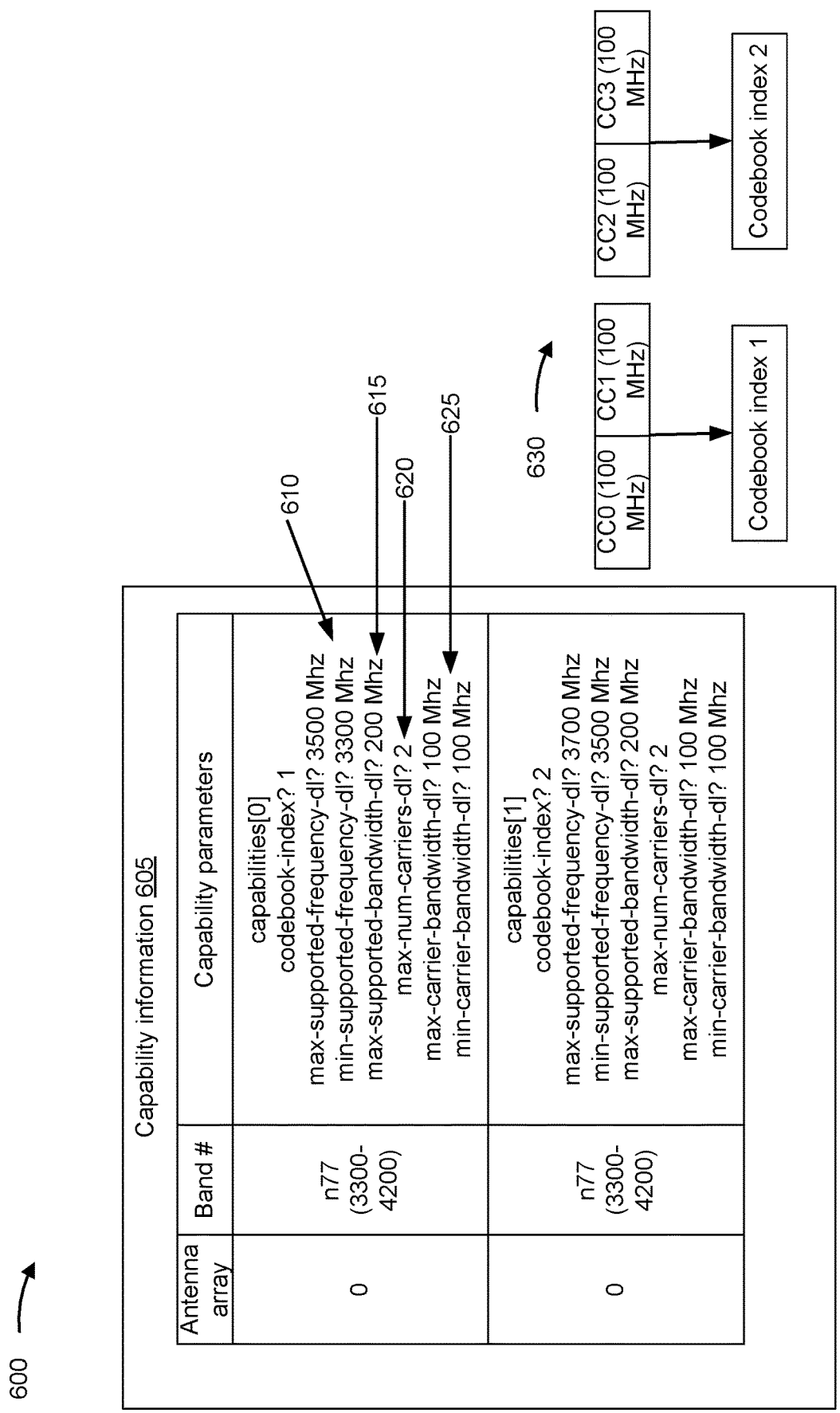

FIG. 6 is a diagram illustrating an example 600 of capability information 605 associated with an antenna array of an RU (e.g., RU 340, the RU of FIG. 4). The RU may output the capability information 605 to a DU (e.g., DU 330, the DU of FIG. 4), and the DU may configure one or more beamforming codebooks for the antenna array of the RU according to the capability information 605.

As shown, the capability information 605 may indicate an antenna array with which the capability information 605 is associated (e.g., antenna array 0). As shown, the capability information 605 may indicate a band with which the capability information 605 is associated (e.g., NR band n77 having a frequency range of 3300 MHz to 4200 MHz). As shown, the capability information 505 may include two capability IEs: one identified as "capabilities[0]" and another identified as "capabilities[1]." Each capability IE may be associated with a codebook index. As shown, a first capability IE is associated with codebook index 1. A second capability IE is associated with codebook index 2. A capability IE associated with a given codebook index may indicate a set of capability parameters that can be used to configure a beamforming codebook for the indicated antenna array (e.g., antenna array 0) and the given band (e.g., band n77). Since there are two capability IEs associated with the indicated antenna array and band, two beamforming codebooks can be configured for the indicated antenna array and band.

As mentioned above, the capability information 605 may indicate a set of capability parameters associated with a codebook index. As shown by reference number 610, the capability information 605 indicates a maximum supported frequency (for a downlink carrier) for codebook index 0 of 3500 MHz and a minimum supported frequency (for a downlink carrier) for codebook index 0 of 3300 MHz. As shown by reference number 615, the capability information 605 indicates a maximum bandwidth (for a beamforming codebook) for codebook index 0 of 200 MHz. As shown by reference number 620, the capability information 605 indicates a maximum number of carriers for codebook index 0 of 2 carriers (e.g., 2 component carriers). As shown by reference number 625, the capability information 605 indicates a maximum carrier bandwidth and a minimum carrier bandwidth (for a downlink carrier) for codebook index 0 of 100 MHz. As shown, codebook index 2 is associated with the same maximum and minimum carrier bandwidths, the same maximum number of carriers, the same maximum bandwidth, and a supported frequency range of 3500 MHz-3700 MHz. Thus, the first set of capability parameters (for codebook index 0) and the second set of capability parameters (for codebook index 1) are associated with different sets of frequencies (e.g., 3300-3500 MHz for codebook index 0 and 3500-3700 for codebook index 1).

Reference number 630 shows a mapping of beamforming codebooks and carriers (e.g., component carriers (CCs)) in accordance with the capability information 605. As shown, a first CC (CC0) and a second CC (CC1), each with a 100 MHz bandwidth, can be mapped to a first beamforming codebook and the antenna array 0, on band n77, according to the set of capability parameters associated with codebook index 1. For example, the first CC may have a frequency range of 3300 MHz-3400 MHz and the second CC may have a frequency range of 3400 MHz-3500 MHz. As further shown, a third CC (CC2) and a fourth CC (CC3), each with a 100 MHz bandwidth, can be mapped to a second beamforming codebook and the antenna array 0, on band n77, according to the set of capability parameters associated with codebook index 2. For example, the third CC may have a frequency range of 3500 MHz-3600 MHz and the fourth CC may have a frequency range of 3600 MHz-3700 MHz. Thus, the capability information 605 indicates how one or more (in example 600, two) beamforming codebooks can be configured for an antenna array, and how each configured beamforming codebook can be associated with one or more carriers.

As indicated above, FIG. 6 is provided as an example. Other examples may differ from what is described with regard to FIG. 6.

Figure 7:
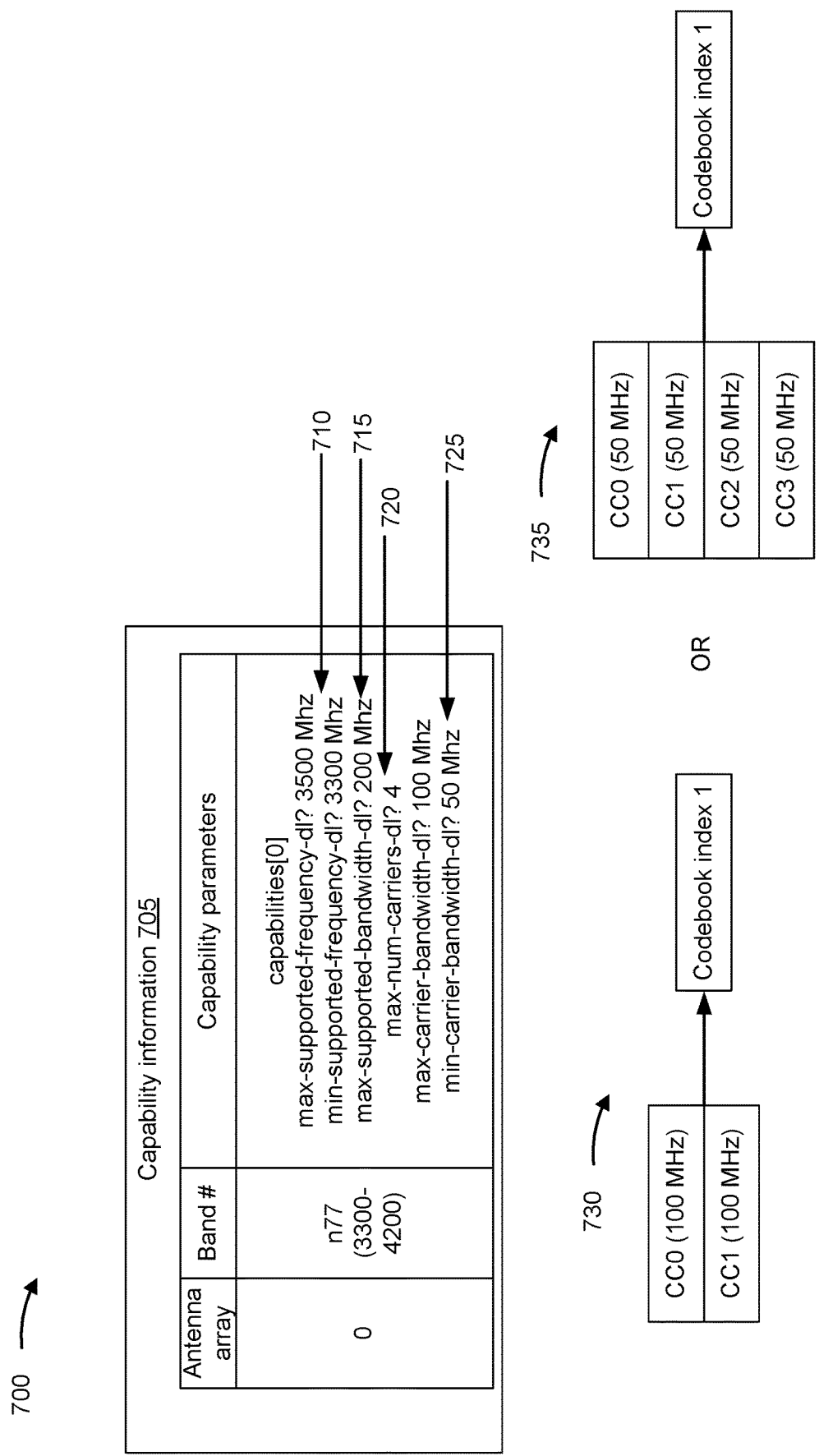

FIG. 7 is a diagram illustrating an example 700 of capability information 705 associated with an antenna array of an RU (e.g., RU 340, the RU of FIG. 4). The RU may output the capability information 705 to a DU (e.g., DU 330, the DU of FIG. 4), and the DU may configure one or more beamforming codebooks for the antenna array of the RU according to the capability information 705.

As shown, the capability information 705 may indicate an antenna array with which the capability information 705 is associated (e.g., antenna array 0). As shown, the capability information 705 may indicate a band with which the capability information 705 is associated (e.g., NR band n77 having a frequency range of 3300 MHz to 4200 MHz). As shown, the capability information 705 may include one capability IE, identified as "capabilities[0]." In example 700, the codebook index is omitted because there is only one capability IE. In some aspects, the capability information 705 may indicate a codebook index. Since there is one capability IE associated with the indicated antenna array and band, one beamforming codebook can be configured for the indicated antenna array and band.

As mentioned above, the capability information 705 may indicate a set of capability parameters associated with a codebook index. As shown by reference number 710, the capability information 705 indicates a maximum supported frequency (for a downlink carrier) of 3500 MHz and a minimum supported frequency (for a downlink carrier) of 3300 MHz. As shown by reference number 715, the capability information 705 indicates a maximum bandwidth (for a beamforming codebook) of 200 MHz. As shown by reference number 720, the capability information 705 indicates a maximum number of carriers of 4 carriers (e.g., 4 component carriers). As shown by reference number 725, the capability information 705 indicates a maximum carrier bandwidth (for a downlink carrier) of 100 MHz and a minimum carrier bandwidth (for a downlink carrier) of 50 MHz.

Reference numbers 730 and 735 show two potential mappings of a beamforming codebook and one or more carriers (e.g., component carriers (CCs)) in accordance with the capability information 705. As shown by reference number 730, a first CC (CC0) and a second CC (CC1), each with a 100 MHz bandwidth, can be mapped to the beamforming codebook and the antenna array 0, on band n77, according to the set of capability parameters. For example, the first CC may have a frequency range of 3300 MHz-3400 MHz and the second CC may have a frequency range of 3400 MHz-3500 MHz. As shown by reference number 735, alternatively, four component carriers (CC0, CC1, CC2, and CC3) can be mapped to the beamforming codebook and the antenna array 0, on band n77, according to the set of capability parameters. For example, each component carrier may have a 50 MHz bandwidth (e.g., CC0=3300 MHz-3350 MHz, CC1=3350 MHz-3400 MHz, CC2=3400 MHz-3450 MHz, CC3=3450 MHz-3500 MHz). Thus, the capability information 705 indicates how a configured beamforming codebook can be associated with different numbers of carriers in accordance with the capability information 705.

As indicated above, FIG. 7 is provided as an example. Other examples may differ from what is described with regard to FIG. 7.

FIG. 8 is a diagram illustrating an example 800 of capability information 805 associated with an antenna array of an RU (e.g., RU 340, the RU of FIG. 4). The RU may output the capability information 805 to a DU (e.g., DU 330, the DU of FIG. 4), and the DU may configure one or more beamforming codebooks for the antenna array of the RU according to the capability information 805.

In example 800, the capability information 805 relates to multiple antenna arrays and multiple bands. As shown, the capability information 805 may include first capability information 810 and second capability information 815. The first capability information 810 may indicate an antenna array with which the first capability information 810 is associated (e.g., antenna array 0). As shown, the first capability information 810 may indicate a band with which the first capability information 810 is associated (e.g., NR band n77 having a frequency range of 3300 MHz to 4200 MHz). As shown, the first capability information 810 may include two capability IEs, identified as "capabilities[0]" and "capabilities[1]." Each capability IE is associated with a different codebook index. Thus, the first capability information 810 indicates a set of capability parameters for a first codebook index and a set of capability parameters for a second codebook index, such that two beamforming codebooks can be configured for antenna array 0 and band n77. The second capability information 815 may indicate an antenna array with which the second capability information 815 is associated (e.g., antenna array 1). As shown, the second capability information 815 may indicate a band with which the second capability information 815 is associated (e.g., NR band n79 having a frequency range of 4400 MHz to 5000 MHz). As shown, the second capability information 815 may include two capability IEs, identified as "capabilities [0]" and "capabilities[1]." Each capability IE is associated with a different codebook index. Thus, the second capability information 815 indicates a set of capability parameters for a third codebook index and a set of capability parameters for a fourth codebook index, such that two beamforming codebooks can be configured for antenna array 1 and band n79.

For antenna array 0 and band n77, a DU may configure up to two beamforming codebooks in accordance with the first capability information 810. For example, the DU may configure a first beamforming codebook associated with a first 100 MHz CC and a second beamforming codebook associated with a second 100 MHz CC. For antenna array 1 and band n79, a DU may configure up to two beamforming codebooks in accordance with the second capability information 815. For example, the DU may configure a third beamforming codebook associated with four 50 MHz CCs and a fourth beamforming codebook associated with another four 50 MHz CCs. Thus, two or more beamforming codebooks can be configured per antenna array of the RU. Each beamforming codebook can be associated with one or more CCs.

As indicated above, FIG. 8 is provided as an example. Other examples may differ from what is described with regard to FIG. 8.

Figure 9:
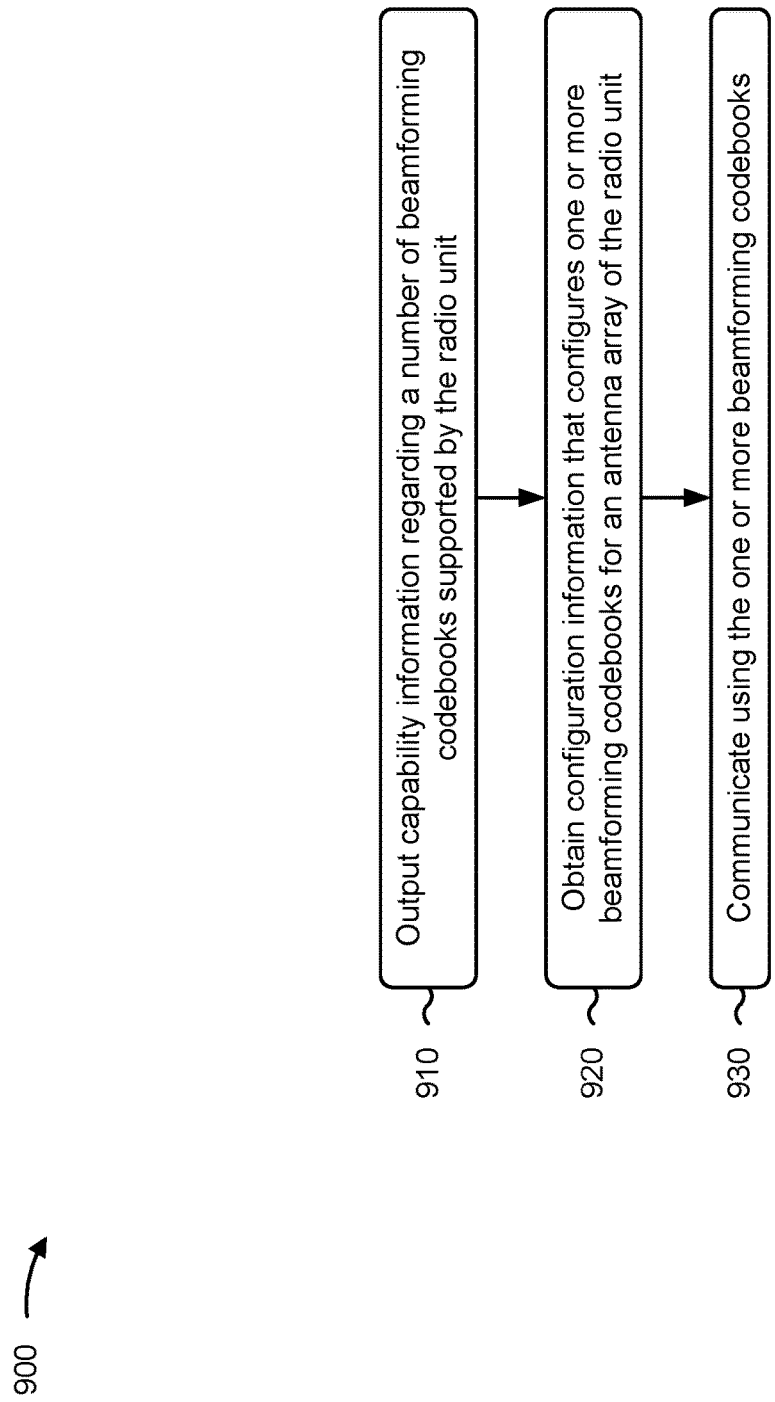
FIG. 9 is a diagram illustrating an example process performed, for example, by a radio unit, in accordance with the present disclosure.

FIG. 9 is a diagram illustrating an example process 900 performed, for example, by a radio unit, in accordance with the present disclosure. Example process 900 is an example where the radio unit (e.g., radio unit 340, the radio unit of FIGS. 4-8) performs operations associated with a capability for multiple beamforming codebooks.

As shown in FIG. 9, in some aspects, process 900 may include outputting capability information regarding a number of beamforming codebooks supported by the radio unit (block 910). For example, the radio unit (e.g., using communication manager 140 and/or capability signaling component 1108, depicted in FIG. 11) may output capability information regarding a number of beamforming codebooks supported by the radio unit, as described above.

As further shown in FIG. 9, in some aspects, process 900 may include obtaining configuration information that configures one or more beamforming codebooks for an antenna array of the radio unit (block 920). For example, the radio unit (e.g., using communication manager 140 and/or reception component 1102, depicted in FIG. 11) may obtain configuration information that configures one or more beamforming codebooks for an antenna array of the radio unit, as described above.

As further shown in FIG. 9, in some aspects, process 900 may include communicating using the one or more beamforming codebooks (block 930). For example, the radio unit (e.g., using communication manager 140 and/or transmission component 1104, depicted in FIG. 11) may communicate using the one or more beamforming codebooks, as described above.

Process 900 may include additional aspects, such as any single aspect or any combination of aspects described below and/or in connection with one or more other processes described elsewhere herein.

In a first aspect, the capability information indicates the antenna array to which the capability information relates.

In a second aspect, alone or in combination with the first aspect, the capability information identifies the number of beamforming codebooks supported by the radio unit.

In a third aspect, alone or in combination with one or more of the first and second aspects, the capability information identifies a codebook index and a set of capability parameters associated with the codebook index.

In a fourth aspect, alone or in combination with one or more of the first through third aspects, the set of capability parameters includes at least one of a maximum supported frequency, a minimum supported frequency, a maximum supported bandwidth for the codebook index, a maximum number of carriers, a maximum carrier bandwidth, or a minimum carrier bandwidth.

In a fifth aspect, alone or in combination with one or more of the first through fourth aspects, the one or more beamforming codebooks are configured in accordance with the set of capability parameters.

In a sixth aspect, alone or in combination with one or more of the first through fifth aspects, the capability information identifies a first codebook index, a first set of capability parameters associated with the first codebook index, a second codebook index, and a second set of capability parameters associated with the second codebook index.

In a seventh aspect, alone or in combination with one or more of the first through sixth aspects, the first set of capability parameters is associated with a first set of frequencies and the second set of capability parameters is associated with a second set of frequencies different than the first set of frequencies.

In an eighth aspect, alone or in combination with one or more of the first through seventh aspects, the capability information identifies a plurality of codebook indexes and a respective set of capability parameters associated with each codebook index of the plurality of codebook indexes.

In a ninth aspect, alone or in combination with one or more of the first through eighth aspects, the one or more beamforming codebooks include a first beamforming codebook and a second beamforming codebook, wherein the first beamforming codebook is associated with a first set of carriers in accordance with the capability information and the second beamforming codebook is associated with a second set of carriers in accordance with the capability information.

In a tenth aspect, alone or in combination with one or more of the first through ninth aspects, the first set of carriers includes a first number of carriers, the second set of carriers includes a second number of carriers, and the first number of carriers is different than the second number of carriers.

In an eleventh aspect, alone or in combination with one or more of the first through tenth aspects, the radio unit is a radio unit of a disaggregated radio access architecture, and the one or more beamforming codebooks are received from a distributed unit of the disaggregated radio access architecture.

In a twelfth aspect, alone or in combination with one or more of the first through eleventh aspects, the antenna array is a first antenna array, the one or more beamforming codebooks are one or more first beamforming codebooks, the RU is associated with a second antenna array associated with one or more second beamforming codebooks, and a particular beam index indicates a first set of beamforming weights in the one or more first beamforming codebooks and a second set of beamforming weights in the one or more second beamforming codebooks.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
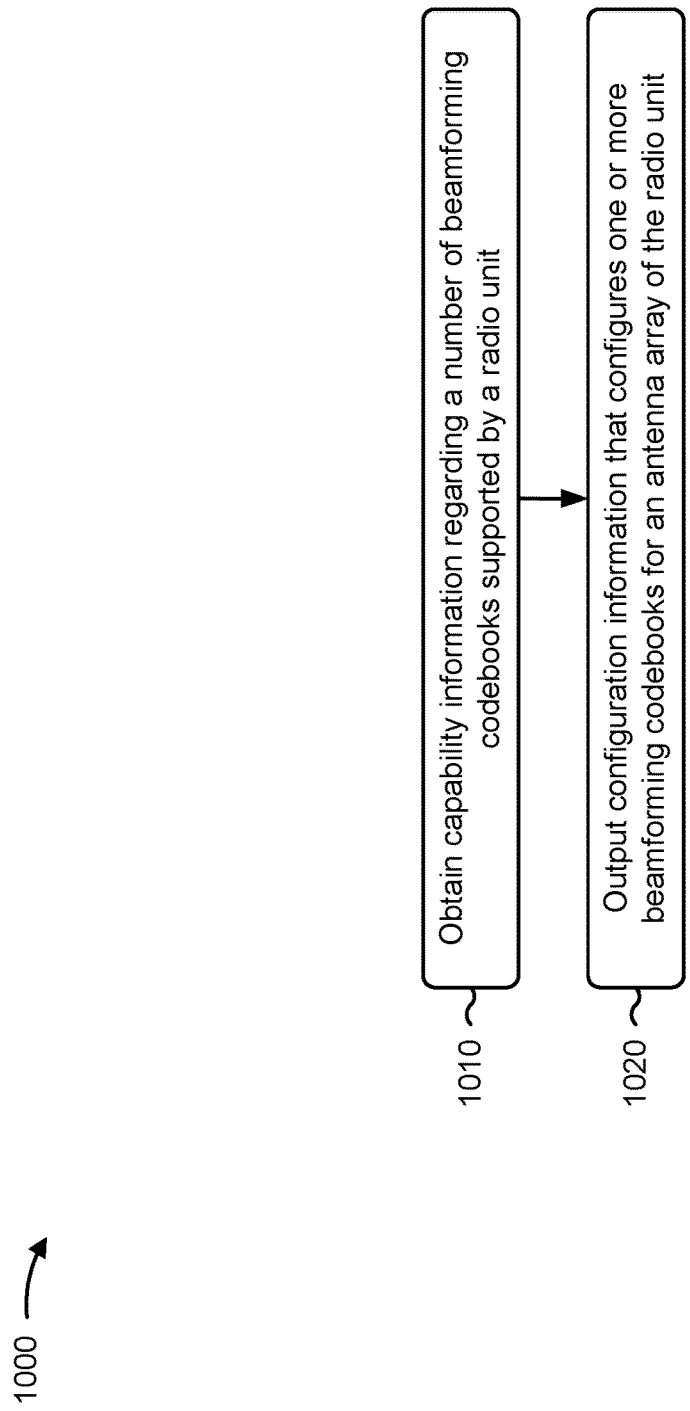
FIG. 10 is a diagram illustrating an example process performed, for example, by a distributed unit, in accordance with the present disclosure.

FIG. 10 is a diagram illustrating an example process 1000 performed, for example, by a distributed unit, in accordance with the present disclosure. Example process 1000 is an example where the distributed unit (e.g., distributed unit 330, the distributed unit of FIGS. 4-8) performs operations associated with a capability for multiple beamforming codebooks.

As shown in FIG. 10, in some aspects, process 1000 may include obtaining capability information regarding a number of beamforming codebooks supported by a radio unit (block 1010). For example, the distributed unit (e.g., using communication manager 150 and/or reception component 1202, depicted in FIG. 12) may obtain capability information regarding a number of beamforming codebooks supported by a radio unit, as described above.

As further shown in FIG. 10, in some aspects, process 1000 may include outputting configuration information that configures one or more beamforming codebooks for an antenna array of the radio unit (block 1020). For example, the distributed unit (e.g., using communication manager 150 and/or configuration component 1208, depicted in FIG. 12) may output configuration information that configures one or more beamforming codebooks for an antenna array of the radio unit, as described above.

Process 1000 may include additional aspects, such as any single aspect or any combination of aspects described below and/or in connection with one or more other processes described elsewhere herein.

In a first aspect, the capability information indicates the antenna array to which the capability information relates.

In a second aspect, alone or in combination with the first aspect, the capability information identifies the number of beamforming codebooks supported by the radio unit.

In a third aspect, alone or in combination with one or more of the first and second aspects, the capability information identifies a codebook index and a set of capability parameters associated with the codebook index.

In a fourth aspect, alone or in combination with one or more of the first through third aspects, the set of capability parameters includes at least one of a maximum supported frequency, a minimum supported frequency, a maximum supported bandwidth for the codebook index, a maximum number of carriers, a maximum carrier bandwidth, or a minimum carrier bandwidth.

In a fifth aspect, alone or in combination with one or more of the first through fourth aspects, the one or more beamforming codebooks are in accordance with the set of capability parameters.

In a sixth aspect, alone or in combination with one or more of the first through fifth aspects, the capability information identifies a first codebook index, a first set of capability parameters associated with the first codebook index, a second codebook index, and a second set of capability parameters associated with the second codebook index.

In a seventh aspect, alone or in combination with one or more of the first through sixth aspects, the first set of capability parameters is associated with a first set of frequencies and the second set of capability parameters is associated with a second set of frequencies different than the first set of frequencies.

In an eighth aspect, alone or in combination with one or more of the first through seventh aspects, the capability information identifies a plurality of codebook indexes and a respective set of capability parameters associated with each codebook index of the plurality of codebook indexes.

In a ninth aspect, alone or in combination with one or more of the first through eighth aspects, the one or more beamforming codebooks include a first beamforming codebook and a second beamforming codebook, wherein the first beamforming codebook is associated with a first set of carriers in accordance with the capability information and the second beamforming codebook is associated with a second set of carriers in accordance with the capability information.

In a tenth aspect, alone or in combination with one or more of the first through ninth aspects, the first set of carriers includes a first number of carriers, the second set of carriers includes a second number of carriers, and the first number of carriers is different than the second number of carriers.

In an eleventh aspect, alone or in combination with one or more of the first through tenth aspects, the radio unit is a radio unit of a disaggregated radio access architecture, and the one or more beamforming codebooks are received from a distributed unit of the disaggregated radio access architecture.

In a twelfth aspect, alone or in combination with one or more of the first through eleventh aspects, the antenna array is a first antenna array, the one or more beamforming codebooks are one or more first beamforming codebooks, the one or more first beamforming codebooks include a particular beam index, the RU is associated with a second antenna array associated with one or more second beamforming codebooks, and the particular beam index indicates a first set of beamforming weights in the one or more first beamforming codebooks and a second set of beamforming weights in the one or more second beamforming codebooks.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
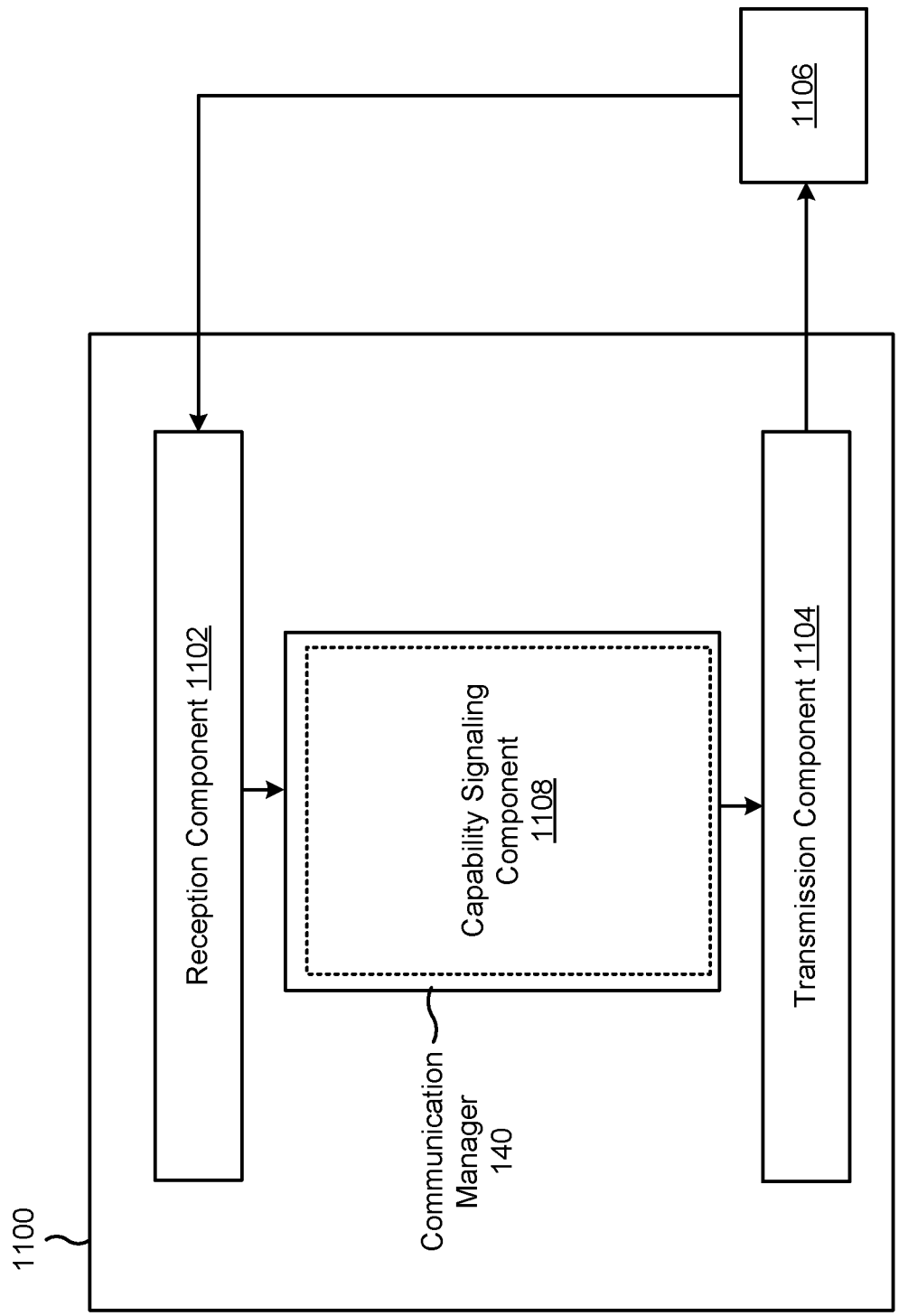
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a radio unit, or a radio unit may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a capability signaling component 1108, among other examples.

In some aspects, the apparatus 1100 may be configured to perform one or more operations described herein in connection with FIGS. 4-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node 110 described in connection with FIG. 2. Additionally, or alternatively, one or more components shown in FIG. 11 may be implemented within one or more components described in connection with FIG. 2. In some aspects, the apparatus 1100 and/or one or more components shown in FIG. 11 may include one or more components of the device 1300 described in connection with FIG. 13. Additionally, or alternatively, one or more components shown in FIG. 11 may be implemented within one or more components described in connection with FIG. 13. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the radio unit described in connection with FIGS. 2 and 13.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the radio unit described in connection with FIGS. 2 and 13. In some aspects, the transmission component 1104 may be co-located with the reception component 1102 in a transceiver.

The capability signaling component 1108 may output capability information regarding a number of beamforming codebooks supported by the radio unit. The reception component 1102 may obtain configuration information that configures one or more beamforming codebooks for an antenna array of the radio unit. The transmission component 1104 may communicate using the one or more beamforming codebooks.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
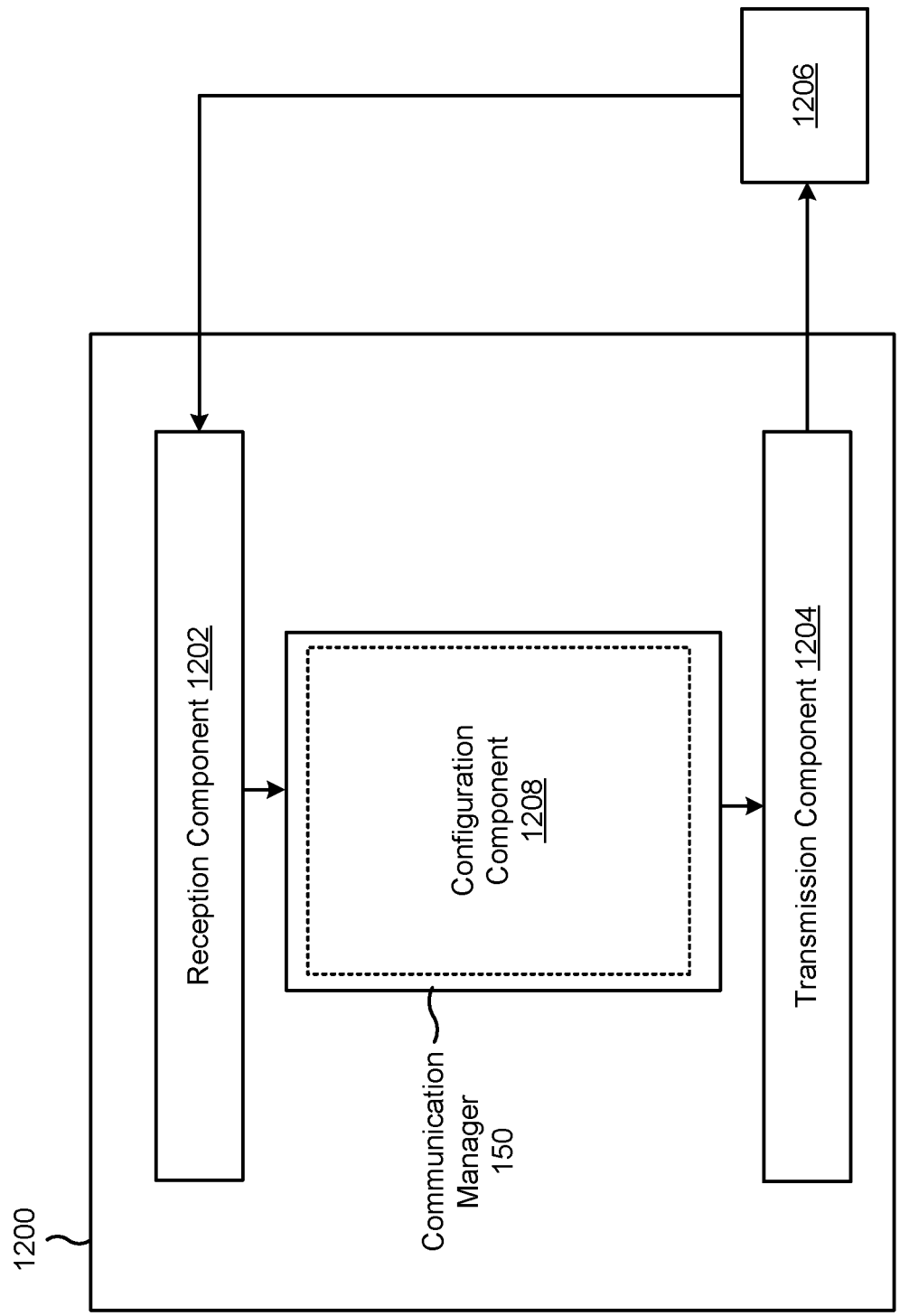
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a distributed unit, or a distributed unit may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include one or more of a configuration component 1208, among other examples.

In some aspects, the apparatus 1200 may be configured to perform one or more operations described herein in connection with FIGS. 4-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the network node 110 described in connection with FIG. 2. Additionally, or alternatively, one or more components shown in FIG. 12 may be implemented within one or more components described in connection with FIG. 2. In some aspects, the apparatus 1200 and/or one or more components shown in FIG. 12 may include one or more components of the device 1300 described in connection with FIG. 13. Additionally, or alternatively, one or more components shown in FIG. 12 may be implemented within one or more components described in connection with FIG. 13. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the distributed unit described in connection with FIGS. 2 and 13.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the distributed unit described in connection with FIGS. 2 and 13. In some aspects, the transmission component 1204 may be co-located with the reception component 1202 in a transceiver.

The reception component 1202 may obtain capability information regarding a number of beamforming codebooks supported by a radio unit. The configuration component 1208 may output configuration information that configures one or more beamforming codebooks for an antenna array of the radio unit.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
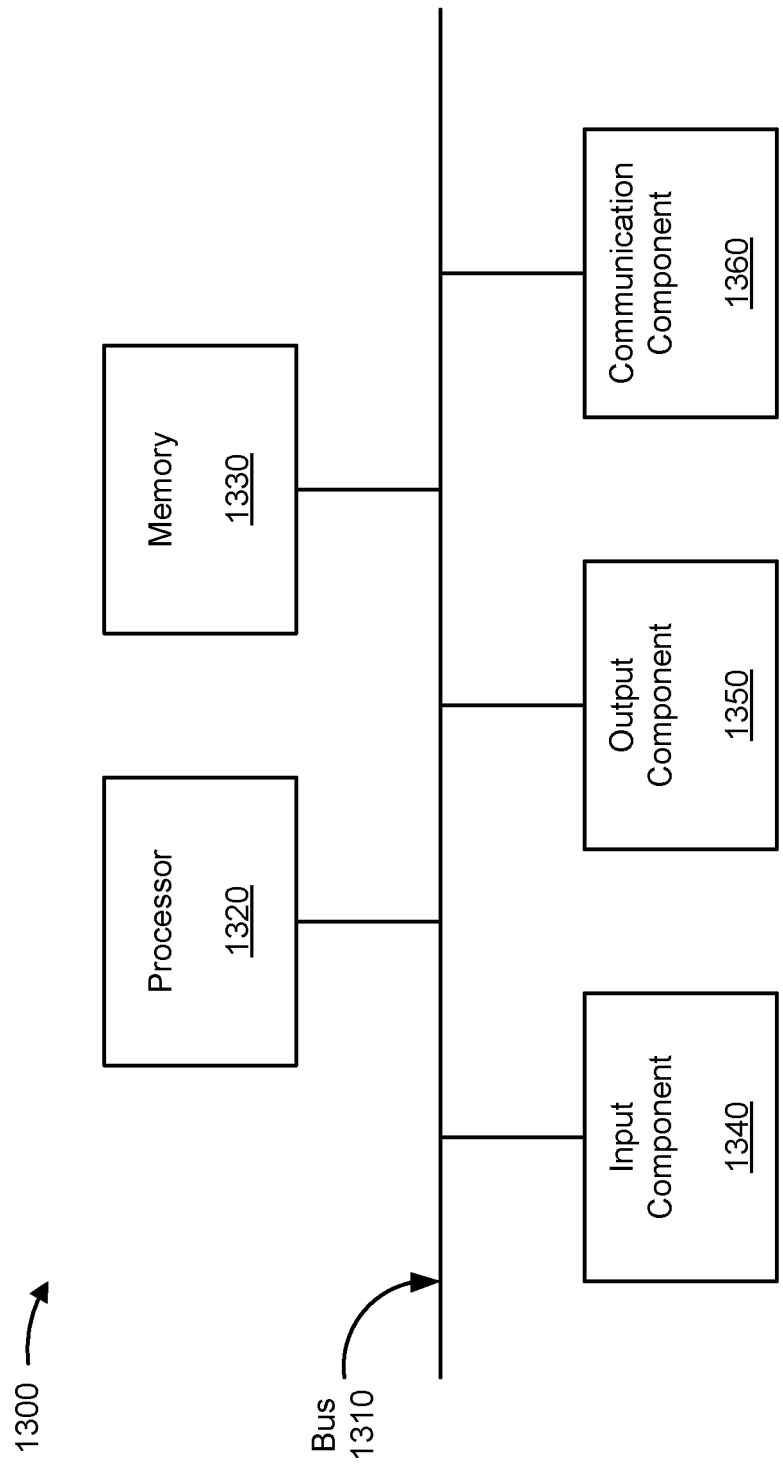
FIG. 13 is a diagram of example components of a device.

FIG. 13 is a diagram of example components of a device 1300. Device 1300 may correspond to network node 110, DU 330, RU 340, the RU of FIGS. 4-8, the DU of FIGS. 4-8, the apparatus 1100, or the apparatus 1200. In some implementations, network node 110, DU 330, RU 340, the RU of FIGS. 4-8, the DU of FIGS. 4-8, the apparatus 1100, or the apparatus 1200 may include one or more devices 1300 and/or one or more components of device 1300. As shown in FIG. 13, device 1300 may include a bus 1310, a processor 1320, a memory 1330, an input component 1340, an output component 1350, and a communication component 1360.

Bus 1310 may include one or more components that enable wired and/or wireless communication among the components of device 1300. Bus 1310 may couple together two or more components of FIG. 13, such as via operative coupling, communicative coupling, electronic coupling, and/or electric coupling. Processor 1320 may include a central processing unit, a graphics processing unit, a microprocessor, a controller, a microcontroller, a digital signal processor, a field-programmable gate array, an application-specific integrated circuit, and/or another type of processing component. Processor 1320 is implemented in hardware, firmware, or a combination of hardware and software. In some implementations, processor 1320 may include one or more processors capable of being programmed to perform one or more operations or processes described elsewhere herein.

Memory 1330 may include volatile and/or nonvolatile memory. For example, memory 1330 may include random access memory (RAM), read only memory (ROM), a hard disk drive, and/or another type of memory (e.g., a flash memory, a magnetic memory, and/or an optical memory). Memory 1330 may include internal memory (e.g., RAM, ROM, or a hard disk drive) and/or removable memory (e.g., removable via a universal serial bus connection). Memory 1330 may be a non-transitory computer-readable medium. Memory 1330 stores information, instructions, and/or software (e.g., one or more software applications) related to the operation of device 1300. In some implementations, memory 1330 may include one or more memories that are coupled to one or more processors (e.g., processor 1320), such as via bus 1310.

Input component 1340 enables device 1300 to receive input, such as user input and/or sensed input. For example, input component 1340 may include a touch screen, a keyboard, a keypad, a mouse, a button, a microphone, a switch, a sensor, a global positioning system sensor, an accelerometer, a gyroscope, and/or an actuator. Output component 1350 enables device 1300 to provide output, such as via a display, a speaker, and/or a light-emitting diode. Communication component 1360 enables device 1300 to communicate with other devices via a wired connection and/or a wireless connection. For example, communication component 1360 may include a receiver, a transmitter, a transceiver, a modem, a network interface card, and/or an antenna.

Device 1300 may perform one or more operations or processes described herein. For example, a non-transitory computer-readable medium (e.g., memory 1330) may store a set of instructions (e.g., one or more instructions or code) for execution by processor 1320. Processor 1320 may execute the set of instructions to perform one or more operations or processes described herein. In some implementations, execution of the set of instructions, by one or more processors 1320, causes the one or more processors 1320 and/or the device 1300 to perform one or more operations or processes described herein. In some implementations, hardwired circuitry is used instead of or in combination with the instructions to perform one or more operations or processes described herein. Additionally, or alternatively, processor 1320 may be configured to perform one or more operations or processes described herein. Thus, implementations described herein are not limited to any specific combination of hardware circuitry and software.

The number and arrangement of components shown in FIG. 13 are provided as an example. Device 1300 may include additional components, fewer components, different components, or differently arranged components than those shown in FIG. 13. Additionally, or alternatively, a set of components (e.g., one or more components) of device 1300 may perform one or more functions described as being performed by another set of components of device 1300.

The following provides an overview of some Aspects of the present disclosure:

Aspect 1: A method of wireless communication performed by a radio unit, comprising: outputting capability information regarding a number of beamforming codebooks supported by the radio unit; obtaining configuration information that configures one or more beamforming codebooks for an antenna array of the radio unit; and communicating using the one or more beamforming codebooks.

Aspect 2: The method of Aspect 1, wherein the capability information indicates the antenna array to which the capability information relates.

Aspect 3: The method of any of Aspects 1-2, wherein the capability information identifies the number of beamforming codebooks supported by the radio unit.

Aspect 4: The method of any of Aspects 1-3, wherein the capability information identifies a codebook index and a set of capability parameters associated with the codebook index.

Aspect 5: The method of Aspect 4, wherein the set of capability parameters includes at least one of: a maximum supported frequency, a minimum supported frequency, a maximum supported bandwidth for the codebook index, a maximum number of carriers, a maximum carrier bandwidth, or a minimum carrier bandwidth.

Aspect 6: The method of Aspect 4, wherein the one or more beamforming codebooks are configured in accordance with the set of capability parameters.

Aspect 7: The method of any of Aspects 1-6, wherein the capability information identifies a first codebook index, a first set of capability parameters associated with the first codebook index, a second codebook index, and a second set of capability parameters associated with the second codebook index.

Aspect 8: The method of Aspect 6, wherein the first set of capability parameters is associated with a first set of frequencies and the second set of capability parameters is associated with a second set of frequencies different than the first set of frequencies.

Aspect 9: The method of any of Aspects 1-8, wherein the capability information identifies a plurality of codebook indexes and a respective set of capability parameters associated with each codebook index of the plurality of codebook indexes.

Aspect 10: The method of any of Aspects 1-9, wherein the one or more beamforming codebooks include a first beamforming codebook and a second beamforming codebook, wherein the first beamforming codebook is associated with a first set of carriers in accordance with the capability information and the second beamforming codebook is associated with a second set of carriers in accordance with the capability information.

Aspect 11: The method of Aspect 10, wherein the first set of carriers includes a first number of carriers, the second set of carriers includes a second number of carriers, and the first number of carriers is different than the second number of carriers.

Aspect 12: The method of any of Aspects 1-11, wherein the radio unit is a radio unit of a disaggregated radio access architecture, and wherein the one or more beamforming codebooks are received from a distributed unit of the disaggregated radio access architecture.

Aspect 13: The method of any of Aspects 1-12, wherein the antenna array is a first antenna array, the one or more beamforming codebooks are one or more first beamforming codebooks, the RU is associated with a second antenna array associated with one or more second beamforming codebooks, and wherein a particular beam index indicates a first set of beamforming weights in the one or more first beamforming codebooks and a second set of beamforming weights in the one or more second beamforming codebooks.

Aspect 14: A method of wireless communication performed by a distributed unit, comprising: obtaining capability information regarding a number of beamforming codebooks supported by a radio unit; and outputting configuration information that configures one or more beamforming codebooks for an antenna array of the radio unit.

Aspect 15: The method of Aspect 14, wherein the capability information indicates the antenna array to which the capability information relates.

Aspect 16: The method of any of Aspects 14-15, wherein the capability information identifies the number of beamforming codebooks supported by the radio unit.

Aspect 17: The method of any of Aspects 14-16, wherein the capability information identifies a codebook index and a set of capability parameters associated with the codebook index.

Aspect 18: The method of Aspect 17, wherein the set of capability parameters includes at least one of: a maximum supported frequency, a minimum supported frequency, a maximum supported bandwidth for the codebook index, a maximum number of carriers, a maximum carrier bandwidth, or a minimum carrier bandwidth.

Aspect 19: The method of Aspect 17, wherein the one or more beamforming codebooks are in accordance with the set of capability parameters.

Aspect 20: The method of any of Aspects 14-19, wherein the capability information identifies a first codebook index, a first set of capability parameters associated with the first codebook index, a second codebook index, and a second set of capability parameters associated with the second codebook index.

Aspect 21: The method of Aspect 20, wherein the first set of capability parameters is associated with a first set of frequencies and the second set of capability parameters is associated with a second set of frequencies different than the first set of frequencies.

Aspect 22: The method of any of Aspects 14-21, wherein the capability information identifies a plurality of codebook indexes and a respective set of capability parameters associated with each codebook index of the plurality of codebook indexes.

Aspect 23: The method of any of Aspects 14-22, wherein the one or more beamforming codebooks include a first beamforming codebook and a second beamforming codebook, wherein the first beamforming codebook is associated with a first set of carriers in accordance with the capability information and the second beamforming codebook is associated with a second set of carriers in accordance with the capability information.

Aspect 24: The method of Aspect 23, wherein the first set of carriers includes a first number of carriers, the second set of carriers includes a second number of carriers, and the first number of carriers is different than the second number of carriers.

Aspect 25: The method of any of Aspects 14-24, wherein the radio unit is a radio unit of a disaggregated radio access architecture, and wherein the one or more beamforming codebooks are received from a distributed unit of the disaggregated radio access architecture.

Aspect 26: The method of any of Aspects 14-25, wherein the antenna array is a first antenna array, the one or more beamforming codebooks are one or more first beamforming codebooks, the one or more first beamforming codebooks include a particular beam index, the RU is associated with a second antenna array associated with one or more second beamforming codebooks, and wherein the particular beam index indicates a first set of beamforming weights in the one or more first beamforming codebooks and a second set of beamforming weights in the one or more second beamforming codebooks.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A radio unit for wireless communication, comprising:
a plurality of antenna arrays;
one or more memories; and
one or more processors, coupled to the one or more memories, configured individually or collectively to:
output capability information regarding a number of beamforming codebooks supported by the radio unit, wherein the capability information indicates an antenna array, of the plurality of antenna arrays associated with the radio unit, to which the capability information relates;
obtain configuration information that configures two or more beamforming codebooks for the antenna array, wherein the two or more beamforming codebooks include a first beamforming codebook and a second beamforming codebook, and
wherein the first beamforming codebook is associated with a first set of carriers in accordance with the capability information and the second beamforming codebook is associated with a second set of carriers in accordance with the capability information; and communicate using the two or more beamforming codebooks to cause the antenna array to generate a beam according to the two or more beamforming codebooks.

2. The radio unit of claim 1, wherein the capability information identifies the number of beamforming codebooks supported by the radio unit.

3. The radio unit of claim 1, wherein the capability information identifies a codebook index and a set of capability parameters associated with the codebook index.

4. The radio unit of claim 3, wherein the set of capability parameters includes at least one of:
a maximum supported frequency,
a minimum supported frequency,
a maximum supported bandwidth for the codebook index,
a maximum number of carriers,
a maximum carrier bandwidth, or
a minimum carrier bandwidth.

5. The radio unit of claim 3, wherein the two or more beamforming codebooks are configured in accordance with the set of capability parameters.

6. The radio unit of claim 1, wherein the capability information identifies a first codebook index, a first set of capability parameters associated with the first codebook index, a second codebook index, and a second set of capability parameters associated with the second codebook index.

7. The radio unit of claim 6, wherein the first set of capability parameters is associated with a first set of frequencies and the second set of capability parameters is associated with a second set of frequencies different than the first set of frequencies.

8. The radio unit of claim 1, wherein the capability information identifies a plurality of codebook indexes and a respective set of capability parameters associated with each codebook index of the plurality of codebook indexes.

9. The radio unit of claim 1, wherein the first set of carriers includes a first number of carriers, the second set of carriers includes a second number of carriers, and the first number of carriers is different than the second number of carriers.

10. The radio unit of claim 1, wherein the radio unit is a radio unit of a disaggregated radio access architecture, and wherein the two or more beamforming codebooks are received from a distributed unit of the disaggregated radio access architecture.

11. The radio unit of claim 1, wherein a particular beam index indicates a first set of beamforming weights in the first beamforming codebook and a second set of beamforming weights in the second beamforming codebook.

12. A distributed unit for wireless communication, comprising:
one or more memories; and
one or more processors, coupled to the one or more memories, configured individually or collectively to:
receive capability information regarding a number of beamforming codebooks supported by a radio unit, wherein the capability information indicates that the capability information relates to an antenna array of a plurality of antenna arrays associated with the radio unit; and
transmit, via management-plane signaling, configuration information that configures two or more beamforming codebooks for the antenna array of the radio unit,
wherein the two or more beamforming codebooks include a first beamforming codebook and a second beamforming codebook, and
wherein the first beamforming codebook is associated with a first set of carriers in accordance with the capability information and the second beamforming codebook is associated with a second set of carriers in accordance with the capability information.

13. The distributed unit of claim 12, wherein the capability information indicates the antenna array to which the capability information relates.

14. The distributed unit of claim 12, wherein the capability information identifies the number of beamforming codebooks supported by the radio unit.

15. The distributed unit of claim 12, wherein the capability information identifies a codebook index and a set of capability parameters associated with the codebook index.

16. The distributed unit of claim 15, wherein the set of capability parameters includes at least one of:
a maximum supported frequency,
a minimum supported frequency,
a maximum supported bandwidth for the codebook index,
a maximum number of carriers,
a maximum carrier bandwidth, or
a minimum carrier bandwidth.

17. The distributed unit of claim 15, wherein the two or more beamforming codebooks are in accordance with the set of capability parameters.

18. The distributed unit of claim 15, wherein the capability information identifies a first codebook index, a first set of capability parameters associated with the first codebook index, a second codebook index, and a second set of capability parameters associated with the second codebook index.

19. The distributed unit of claim 18, wherein the first set of capability parameters is associated with a first set of frequencies and the second set of capability parameters is associated with a second set of frequencies different than the first set of frequencies.

20. The distributed unit of claim 18, wherein the capability information identifies a plurality of codebook indexes and a respective set of capability parameters associated with each codebook index of the plurality of codebook indexes.

21. The distributed unit of claim 12, wherein the first set of carriers includes a first number of carriers, the second set of carriers includes a second number of carriers, and the first number of carriers is different than the second number of carriers.

22. The distributed unit of claim 12, wherein the radio unit is a radio unit of a disaggregated radio access architecture, and wherein the two or more beamforming codebooks are received from a distributed unit of the disaggregated radio access architecture.

23. The distributed unit of claim 12, wherein a particular beam index indicates a first set of beamforming weights in the first beamforming codebook and a second set of beamforming weights in the second beamforming codebook.

24. A method of wireless communication performed by a radio unit, comprising:
outputting capability information regarding a number of beamforming codebooks supported by the radio unit, wherein the capability information indicates an antenna array, of a plurality of antenna arrays associated with the radio unit, to which the capability information relates;

obtaining configuration information that configures two or more beamforming codebooks for the antenna array,
   wherein the two or more beamforming codebooks include a first beamforming codebook and a second beamforming codebook, and
   wherein the first beamforming codebook is associated with a first set of carriers in accordance with the capability information and the second beamforming codebook is associated with a second set of carriers in accordance with the capability information; and
communicating using the two or more beamforming codebooks to cause the antenna array to generate a beam according to the two or more beamforming codebooks.

25. A method of wireless communication performed by a distributed unit, comprising:
receiving capability information regarding a number of beamforming codebooks supported by a radio unit,
   wherein the capability information indicates an antenna array, of a plurality of antenna arrays associated with the radio unit, to which the capability information relates; and
transmitting, via management-plane signaling, configuration information that configures two or more beamforming codebooks for the antenna array of the radio unit,
   wherein the two or more beamforming codebooks include a first beamforming codebook and a second beamforming codebook, and
   wherein the first beamforming codebook is associated with a first set of carriers in accordance with the capability information and the second beamforming codebook is associated with a second set of carriers in accordance with the capability information.

26. The method of claim 24, wherein a particular beam index indicates a first set of beamforming weights in the first beamforming codebook and a second set of beamforming weights in the second beamforming codebook.

27. The method of claim 24, wherein the radio unit is a radio unit of a disaggregated radio access architecture, and wherein the two or more beamforming codebooks are received from a distributed unit of the disaggregated radio access architecture.

28. The method of claim 25, wherein a particular beam index indicates a first set of beamforming weights in the two or more beamforming codebooks and a second set of beamforming weights in the two or more beamforming codebooks.

29. The method of claim 25, wherein the capability information identifies a codebook index and a set of capability parameters associated with the codebook index.

* * * * *